United States Patent
Frolov

(10) Patent No.: US 9,505,069 B2
(45) Date of Patent: Nov. 29, 2016

(54) SLIDING TABLE ASSEMBLY FOR A SAW MACHINE

(71) Applicants: Robert Bosch Tool Corporation, Broadview, IL (US); Robert Bosch GmbH, Stuttgart (DE)

(72) Inventor: Andrew Frolov, Glenview, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 280 days.

(21) Appl. No.: 13/804,052

(22) Filed: Mar. 14, 2013

(65) Prior Publication Data

US 2014/0265102 A1    Sep. 18, 2014

(51) Int. Cl.
*B23D 47/02*    (2006.01)

(52) U.S. Cl.
CPC .................. *B23D 47/025* (2013.01)

(58) Field of Classification Search
CPC ......... B23D 47/025; B23Q 1/74; B25H 1/14
See application file for complete search history.

(56) References Cited

U.S. PATENT DOCUMENTS

| | | | |
|---|---|---|---|
| 2,260,421 A | 10/1941 | Tracy | |
| 3,866,502 A * | 2/1975 | Brewer, Sr. | 83/477.2 |
| 4,408,509 A | 10/1983 | Winchip | |
| 5,116,249 A * | 5/1992 | Shiotani et al. | 83/435.14 |
| 5,375,679 A * | 12/1994 | Biehl | 182/181.1 |
| 5,771,767 A | 6/1998 | Itami | |
| 6,080,041 A | 6/2000 | Greenland | |
| 6,112,785 A | 9/2000 | Yu | |
| 6,189,429 B1 * | 2/2001 | Liu | 83/477 |
| 6,276,990 B1 | 8/2001 | Greenland | |
| 6,293,176 B1 * | 9/2001 | Talesky | 83/438 |
| 6,439,280 B1 | 8/2002 | Wang | |

(Continued)

FOREIGN PATENT DOCUMENTS

| | | | |
|---|---|---|---|
| CA | 2436301 A1 * | 1/2005 | |
| JP | 2009196219 A * | 9/2009 | |

OTHER PUBLICATIONS

Survey_of_Sliding_Table_Attachments.pdf, website printout of "http://benchmark.20m.com/articles/SurveyOfSlidingTables/surveyofslidingtables.html", printed Mar. 14, 2013.

(Continued)

*Primary Examiner* — Joseph J Hail
*Assistant Examiner* — Marc Carlson
(74) *Attorney, Agent, or Firm* — Maginot Moore & Beck LLP

(57) ABSTRACT

A sliding table assembly for a main table of a saw machine includes a sliding table member having a planar upper surface, a miter slot, and a rail structure, and a bracket structure configured to be attached to a mounting structure on the main table of the table saw. The bracket structure is configured to squeeze the rail structure to provide zero clearance support for slidably retaining the sliding table member. Vertical and horizontal position adjustment mechanisms are operably connected to the bracket structure and configured to move at least a portion of the bracket structure horizontally as well as vertically with respect to the mounting structure to align the upper surface of the sliding table member in plane with the upper surface of the main table and to align the miter slot parallel to a blade of the saw machine.

13 Claims, 10 Drawing Sheets

(56) References Cited

U.S. PATENT DOCUMENTS

| | | | |
|---|---|---|---|
| 6,450,077 B1* | 9/2002 | Ceroll et al. | 83/468.7 |
| 6,508,281 B1* | 1/2003 | Wang | 144/287 |
| 6,619,348 B2* | 9/2003 | Wang | 144/287 |
| 6,688,202 B2 | 2/2004 | Parks et al. | |
| 6,817,275 B1* | 11/2004 | Chin-Chin | 83/435.11 |
| 7,337,701 B2* | 3/2008 | Smith | 83/438 |
| 7,444,945 B2* | 11/2008 | Wang | 108/20 |
| 7,490,643 B2* | 2/2009 | Liu et al. | 144/286.5 |
| 7,497,239 B2* | 3/2009 | Smith | 144/286.5 |
| 7,997,176 B2 | 8/2011 | Gass et al. | |
| 2002/0074706 A1* | 6/2002 | Wang | 269/296 |
| 2002/0092397 A1* | 7/2002 | Liu | 83/471 |
| 2002/0194971 A1 | 12/2002 | Park et al. | |
| 2003/0140985 A1* | 7/2003 | Wang | 144/287 |
| 2003/0213349 A1* | 11/2003 | Chang | 83/438 |
| 2004/0163520 A1* | 8/2004 | Nurenberg et al. | 83/471.3 |
| 2006/0201403 A1* | 9/2006 | Wang | 108/143 |
| 2006/0213579 A1* | 9/2006 | Liu et al. | 144/287 |
| 2007/0113928 A1* | 5/2007 | Liu et al. | 144/286.5 |
| 2009/0007743 A1* | 1/2009 | Yu | 83/477 |
| 2012/0000339 A1* | 1/2012 | Koegel | 83/856 |

OTHER PUBLICATIONS

International Search Report and Written Opinion corresponding to PCT Application No. PCT/US2014/022620, mailed Jul. 30, 2014 (9 pages).

* cited by examiner

SLIDING TABLE ASSEMBLY FOR A SAW MACHINE

TECHNICAL FIELD

This disclosure relates generally to power tool, and particularly to tables and table extensions for table saws.

BACKGROUND

Table or bed support mounted cutting tools, such as table saws or planers, are valuable tools used for a variety of tasks, such as cross-cutting wood, and ripping large boards or panels into narrow strips. While there are a variety of table saw and planer designs, most table saws and planers include a table structure having a planar support surface for supporting a workpiece, such as a piece of wood, and a cutting element, such as a circular saw blade, mounted below the support surface with a cutting portion of the cutting element extending through an opening in the support surface to perform cutting operations on the workpiece or a cutterhead, mounted above the bed support to perform cutting operations on the workpiece and the workpiece feeds through a infeed roller. In use, a workpiece is moved across the support surface of the table or bed support in a cutting direction and into contact with the cutting portion of the cutting element. The workpiece is moved in the cutting direction through the cutting element so that the cutting portion of the cutting element performs the desired cut on the workpiece.

Sliding tables have been incorporated into the main table or the bed support to facilitate the movement of workpieces across the main table parallel to the blade. The sliding tables are typically attached a lateral edge of the main table or integrated into an intermediate section of the main table. However, traditional sliding table assemblies for table saws and planers are typically very costly and bulky. In addition, the methods and techniques used to mount and support traditional sliding tables result in a lot of play between the supports and the sliding table which makes it difficult to perform precise, accurate cuts

DRAWINGS

DESCRIPTION

Figure 1:
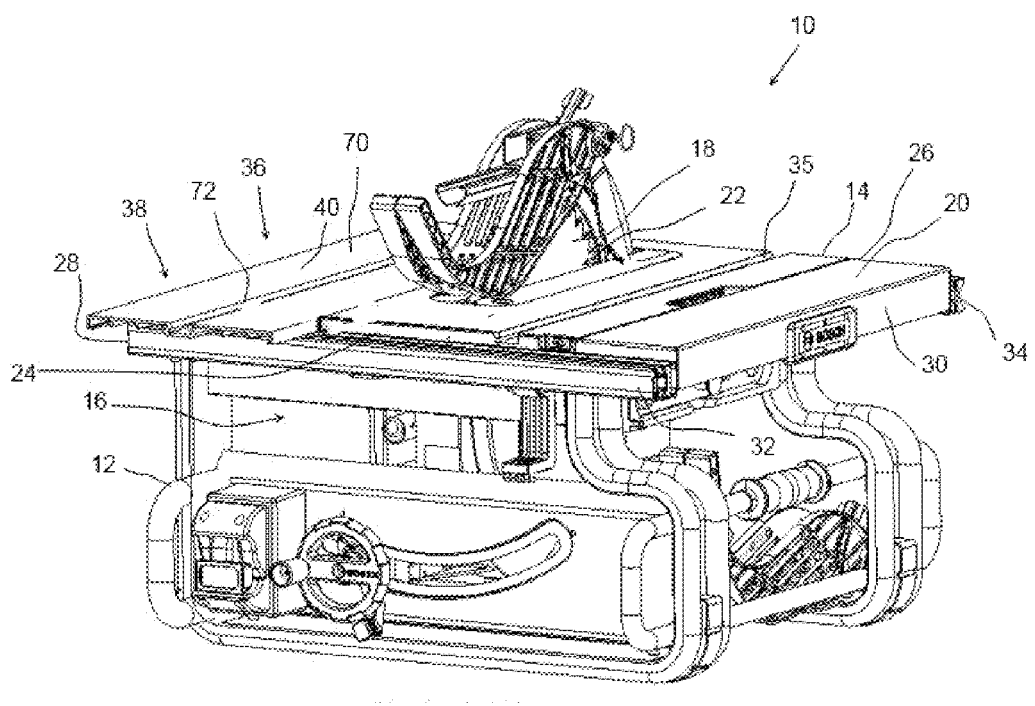
FIG. 1 is a perspective view of a table saw including a sliding table extension in accordance with one embodiment of the present disclosure.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one of ordinary skill in the art to which this disclosure pertains.

FIG. 1 illustrates a power tool 10 in accordance with the principles of the present disclosure. The power tool can be a table saw, a miter saw, a compound saw, a vertical saw, planer, or any saw device with a cutting element. The power tool 10 is a table saw 10 and includes a frame 12 and a main table 14. The frame 12 defines an enclosure space 16 where the components of a cutting assembly, such as a motor (not shown), drive system (not shown), bevel and blade height adjustment system (not shown), and circular saw blade 18, are mounted. The main table 14 is supported on the frame 12 above the cutting assembly and includes a generally planar upper surface 20 that serves as a workpiece support surface. The circular saw blade 18 extends upwardly through a blade opening 22 defined in the main table 14.

Figure 2:
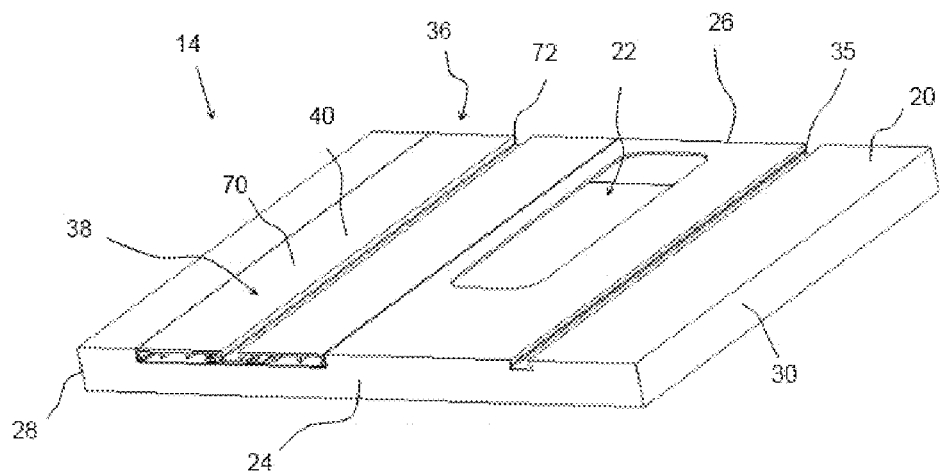
FIG. 2 is a perspective view of the main table and sliding table assembly of the table saw of FIG. 1 removed from the table saw.

Referring to FIG. 2, the main table 14 includes a front edge portion 24, a rear edge portion 26, a left lateral edge portion 28, and a right lateral edge portion 30 that define the perimeter of the main table 14. The distance between the left later edge portion 28 and right lateral edge portion 30 corresponds to the width of the main table 14, and the distance between the front edge portion 24 and rear edge portion 26 corresponds to the depth of the main table 14. As depicted in FIG. 1, a front rail 32 is secured on brackets mounted to the front edge portion 24 of the main table 14 and a rear rail 34 is secured on brackets mounted to rear edge portion 26 of the main table 14 and able to slide along with right side extension table. The front and rear rails 32, 34 are configured to cooperate with the locking mechanisms of a rip fence (not shown) to secure the rip fence at a desired position in relation to the blade 18.

As depicted in FIGS. 1 and 2, the main table 14 may also include one or more slots or grooves 35 that extend between the front edge portion 24 and rear edge portion 26 of the main table 14 parallel to the blade 18. The slots or grooves 35 are configured to enable various table saw accessories, such as a miter gauge (not shown), to be mounted to or moved across the main table 14. In one embodiment, the slots 35, referred to herein as miter slots, have a T-shaped configuration that conforms to a predefined standard, such as North American or European, for interfacing with table saw accessories.

Referring to FIGS. 1-4, a sliding table assembly 36 is integrated into the main table 14. The main table 14 includes a sliding table mounting position 38 configured to receive the sliding table assembly 36. The sliding table assembly 36 includes a sliding table member 40 and a support assembly 42. The support assembly 42 is attached to sliding table mounting position 38 and is configured to slidably support the sliding table member 40 for movement along an axis parallel to the blade. The sliding table member 40 is configured to slide between a first position (FIG. 3) where the sliding table member 40 extends beyond the front edge portion 24 of the main table 14 and a second position (FIG. 4) where the sliding table member 40 extends beyond the rear edge 24 of the main table 14.

Figure 5:
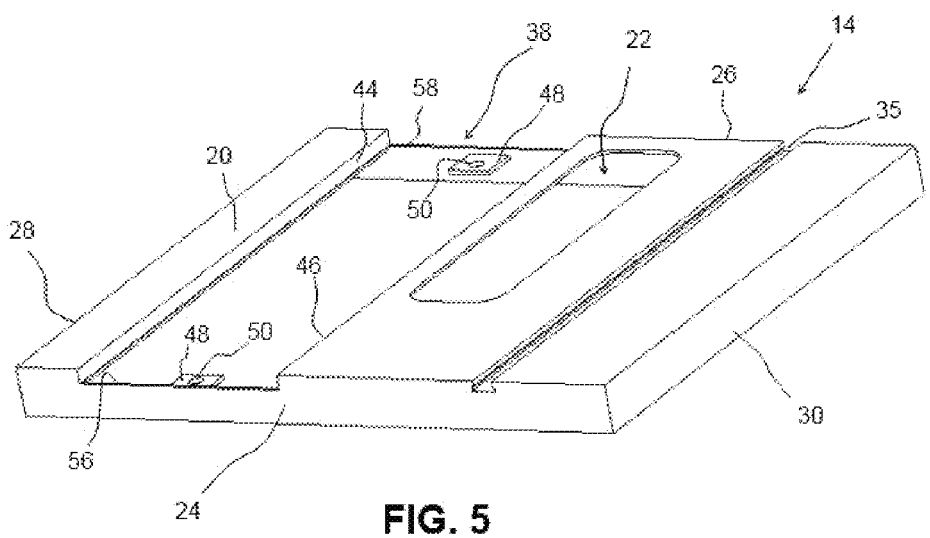
FIG. 5 is a perspective view of the main table of FIG. 2 with the sliding table assembly removed.

An example of a sliding table mounting position 38 can be seen in FIG. 5. The sliding table mounting position 38 of FIG. 5 includes a first sidewall 44 and a second sidewall 46 that extend downwardly from the upper surface 20 and run from the front edge portion 24 to the rear edge portion 26 of the main table 14. The first sidewall 44 and second sidewall 46 define a recess or opening in the main table 14 that is sized to receive the sliding table member 40. The distance between the first and second sidewalls 44, 46 defines the width of the recess or opening. The width of the recess or opening is configured to be slightly greater than the width of the sliding table member 40 between the lateral edges so that the sliding table member 40 can be received between the sidewalls 44, 46.

In one embodiment, the sliding table assembly 36 is configured to be provided as a separate and independent subassembly that can be installed and removed from the main table 14 as a unit. In this embodiment, the support assembly 42 is configured to removably attached to mounting structures provided in the sliding table mounting position 38 of the main table 14. The mounting structures may comprise metal plates, brackets, or tabs located in or near the sliding table mounting position having holes or openings for receiving fasteners, such as screws or bolts. In the embodiment of FIG. 5, the mounting structures comprise metal brackets 48 that define mounting holes 50.

Figure 3:
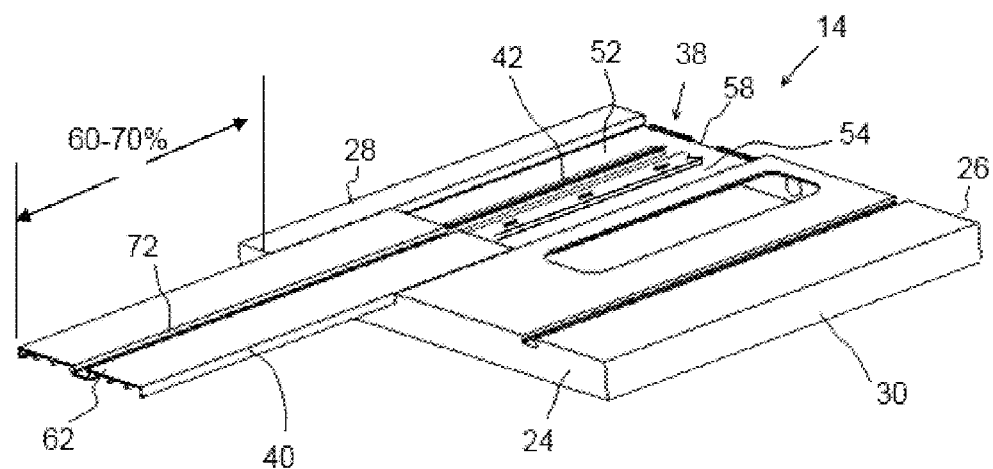
FIG. 3 is a perspective view of the main table and sliding table assembly of the table saw of FIG. 1 with the sliding table assembly in a first extended position.
Figure 4:
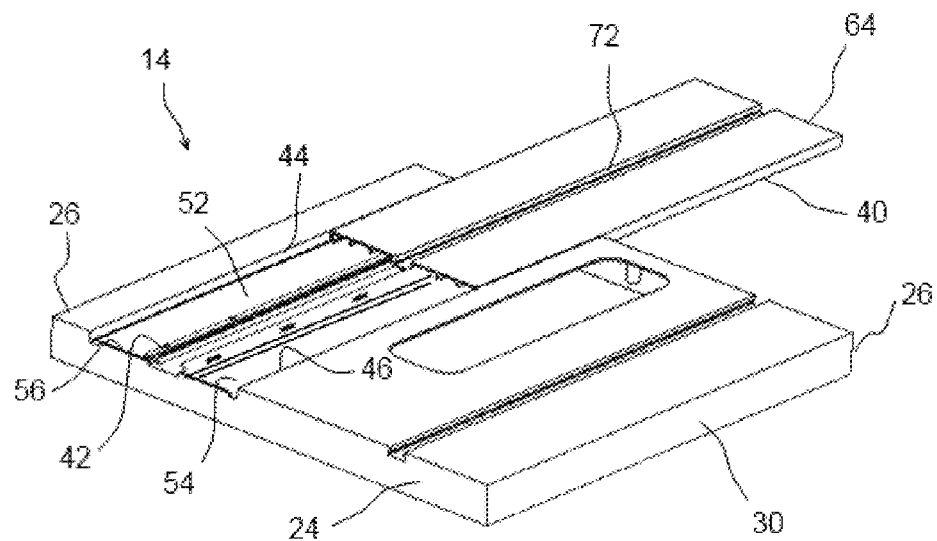
FIG. 4 is a perspective view of the main table and sliding table assembly of the table saw of FIG. 1 with the sliding table assembly in a second extended position.

As depicted in FIG. 5, the bottom portion of the sliding table mounting position 38 may be left open to reduce weight and material cost of the main table 14. In this embodiment, a separate cover or shield (not shown) made from other materials, such as plastic, may be inserted into the open area to shield and protect the interior of the frame 12. Alternatively, horizontal walls 52, 54 may be attached to the lower portions of the sidewalls 44, 46 and to the recessed portions 56, 58 of the front edge 24 and rear edge 26 of the main table 14 as depicted in FIGS. 3 and 4. The horizontal walls 52, 54 may be configured to cover all or a portion of the bottom of sliding table mounting position 38. Horizontal walls extending below the sliding table assembly 36 may be configured to provide support for the lateral edge portions of the sliding table member 40.

Figure 6:
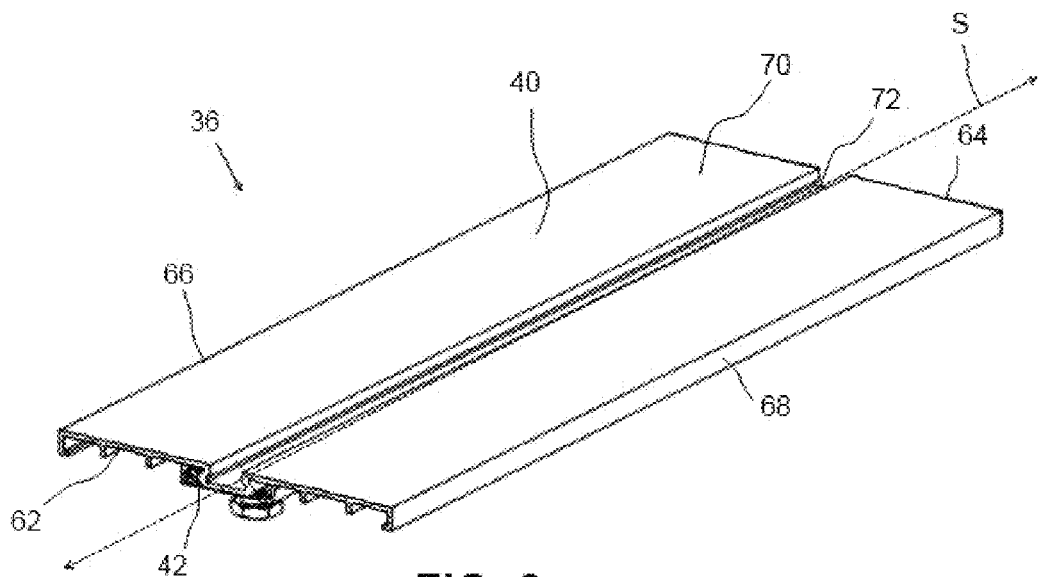
FIG. 6 is a perspective view of the sliding table assembly of FIG. 2 removed from the main table.

Referring to FIG. 6, the sliding table member 40 includes a front edge portion 62, a rear edge portion 64, a first lateral edge portion 66, and a second lateral edge portion 68 that define a generally rectangularly shaped perimeter for the sliding table member 40. When positioned on the main table 14, the front edge portion 62 of the sliding table member 40 is arranged toward the front edge portion 24 of the main table 14, the rear edge portion 64 of the sliding table is arranged toward the rear edge portion 26, the first lateral edge portion 66 is arranged adjacent the first sidewall 44, and the second lateral edge portion 68 is arranged adjacent to the second sidewall 46. The distance between the front edge portion 62 and the rear edge portion 64 of the sliding table member 40 is selected to match the depth of the main table 14 so that the front edge portion 62 and the rear edge portion 64 of the sliding table member 40 are aligned with the front edge portion 24 and rear edge portion 26 of the main table 14, respectively, when the sliding table member 40 is in the centered position as depicted in FIG. 2.

The sliding table member 40 includes a generally planar upper surface 70 that is configured to be aligned in plane with the upper surface 20 of the main table 14 by the support assembly 42. The sliding table member 40 also includes a miter slot 72 that is defined in the upper surface 70 extending between the front edge portion 62 and the rear edge portion 64 of the sliding table member 40. The miter slot 72 may have the same configuration as the miter slot 35 in the main table 14. As depicted in FIGS. 2-4, the support assembly 42 is configured to support the sliding table member 40 with the miter slot 72 arranged parallel to the blade 18.

To enable sliding of the sliding table member 40 with respect to the support assembly 42, the sliding table member 40 includes at least one rail structure 74 that protrudes from the bottom portion 76 of the sliding table member 40 and extends along the bottom portion 76 between the front edge portion 62 and the rear edge portion 64. The sliding table member 40 of FIGS. 6-9 includes a single rail structure 74, also referred to as a monorail, that is substantially centered between the first and second lateral edges 66, 68. The monorail 74 defines the sliding axis S (FIG. 6) for the sliding table member 40 and is arranged parallel to the path of movement of the sliding table member 40.

Figure 7:
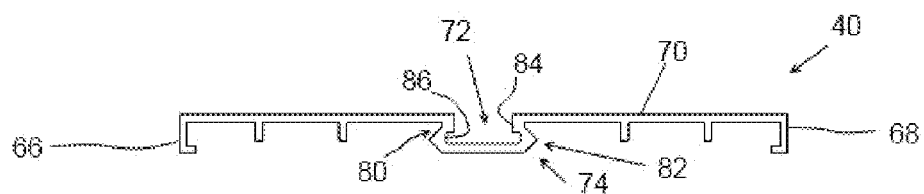
FIG. 7 is an end view of a sliding table member of FIG. 6 showing an embodiment of a monorail structure with a split diamond configuration and a miter slot per a North American standard.
Figure 8:
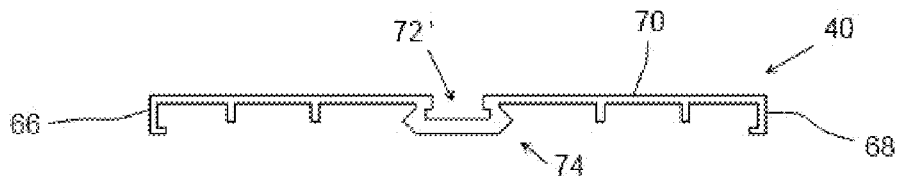
FIG. 8 is an end view of a sliding table member of FIG. 6 showing an embodiment of a monorail structure with a split diamond configuration and a miter slot per a European standard.
Figure 9:
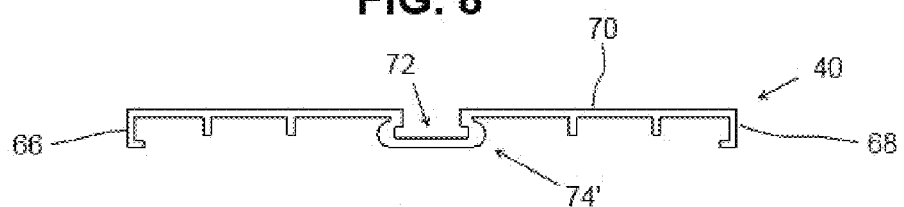
FIG. 9 is an end view of a sliding table member of FIG. 6 showing an embodiment of a monorail structure with a split cylinder configuration.
Figure 10:
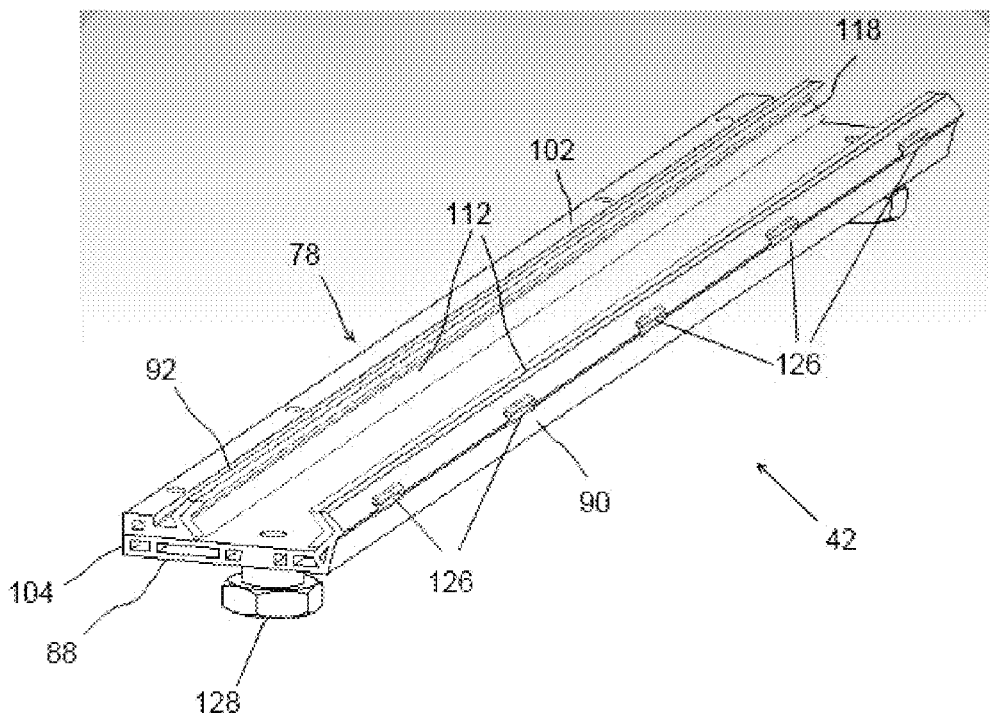
FIG. 10 is a perspective view of an embodiment of the support assembly of the sliding table assembly of FIG. 6.

Referring to FIGS. 7-9, the monorail 74 has a cross-sectional shape that is configured to be received and slidably retained in a complementarily configured bracket structure 78 provided in the support assembly 42. The monorail 74 may be provided with a variety of cross-sectional shapes. As depicted in FIG. 7, a monorail 74 is narrower, or includes a narrower portion 80, adjacent to the bottom surface 76 of the sliding table member 40 and widens, or includes a wider portion 82, extending downwardly from the narrower portion 80 in a direction away from bottom surface 76. In the embodiment of FIGS. 7 and 8, the monorail 74 has angled outer surfaces that define a split diamond shape in cross-section. In one alternative embodiment, a monorail 74' has a split cylinder shape in cross-section as depicted in FIG. 9.

In one embodiment, the sliding table member 40 comprises an extrusion of a strong, rigid material, such as aluminum. By providing the sliding table member 40 as an extrusion, the sliding table member 40 can be manufactured without requiring additional machining of the surfaces and with minimal material usage. In addition, the T-shaped miter slot 72 can be easily integrated into the monorail 74 structure to further minimize material use. For example, as depicted in FIG. 7, the miter slot includes a narrow portion 84 that extends from the upper surface 70 through the narrow portion 80 of the monorail 74 to a wide portion 86 that is located in the wider portion 82 of the monorail 74.

As discussed above, the miter slots 35, 72 may be configured to conform to an industrialized standard. The miter slot 72 of the sliding table embodiment of FIG. 7 is configured to conform to a North American standard for miter slots. The miter slot 72' of the sliding table embodiment of FIG. 8 is configured to conform to a European standard for miter slots. By forming the sliding table member 40 as an extrusion, a single mold tool can be used to form both sliding table types by using different inserts to define the different miter slot shapes.

As can be seen in FIGS. 3 and 4, the bracket structure 78 of the support assembly 42 extends across the main table 14 in the sliding table mounting position 38. Referring to FIGS. 10-13, the bracket structure 78 comprises a main support member 88, a first bracket member 90, and a second bracket member 92. The main support member 88 comprises a plate or beam that is positioned directly below the monorail 74 of the sliding table member 40. The first bracket member 90 extends upwardly from a first portion of the main support member 88 to be positioned alongside a first lateral surface 94 of the monorail 74. The second bracket member 92 extends upwardly from a second portion of the main support member 88 to be positioned along a second lateral surface 96 of the monorail 74.

The bracket members 90, 92 are configured to extend substantially along the entire length of the monorail 74. At least one of the bracket members is movably mounted to the main support member 88 in a manner that enables the bracket member to be secured at positions that are closer to or farther away from the other bracket member. The at least one movable bracket member is pushed against the lateral surface of the monorail 74 until the monorail 74 is squeezed tightly between the bracket members 90, 92 and is then secured to the main support member 88 in this position.

The sliding table assembly 36 of FIGS. 6-13 is configured as a separate and independent subassembly that can be assembled and adjusted while removed from the main table 14 and then mounted to the main table 14 as a unit. This configuration enables the sliding table assembly to be provided as an accessory kit. To facilitate easy assembly and installation of sliding table assembly 36, the first bracket member 90 is fixedly attached to or integrated into the main support member 88 while the second bracket member 92 is movably mounted to the main support member 88.

The configuration of the support assembly 42 of FIGS. 6-13 enables the sliding table assembly 36 to be secured to the main table 14 by attaching a single part, i.e., the main support member 88 to the main table 14. This configuration also enables the gap adjustment for the bracket members to be performed by adjusting the position of a single part, i.e., the movable bracket member 92. In addition, the sliding table member 40 can be secured to the support assembly 42 when the assembly is removed from the main table 14 which facilitates transport and handling of the sliding table assembly 36.

Figure 11:
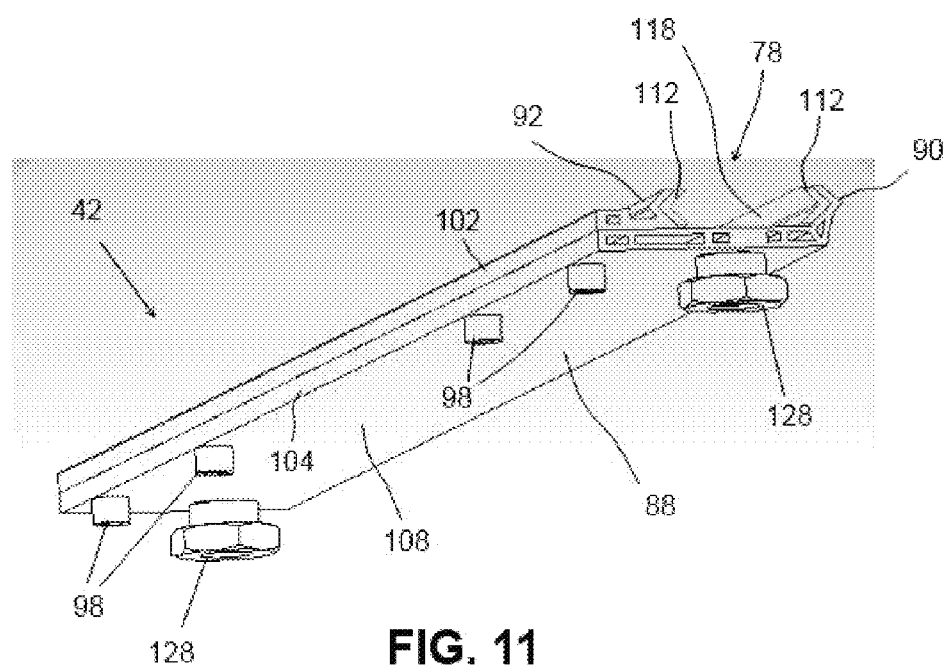
FIG. 11 is a bottom perspective view of the support assembly of FIG. 10.
Figure 12:
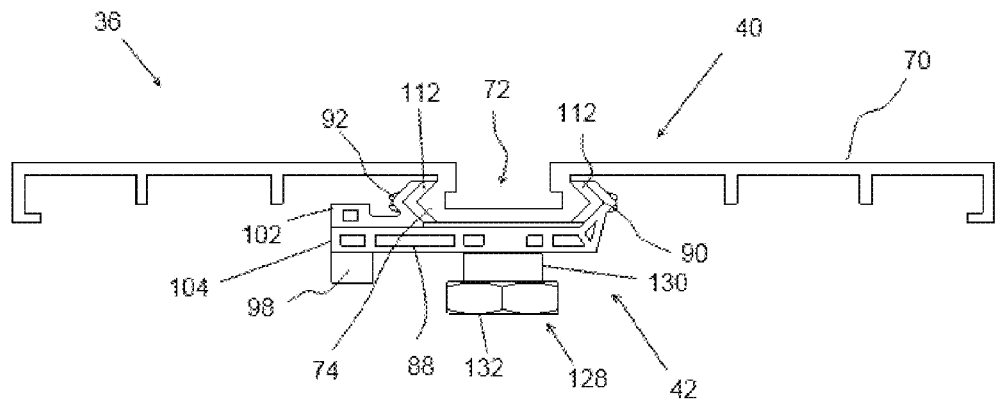
FIG. 12 is an end view of the sliding table assembly of FIG. 6.
Figure 13:
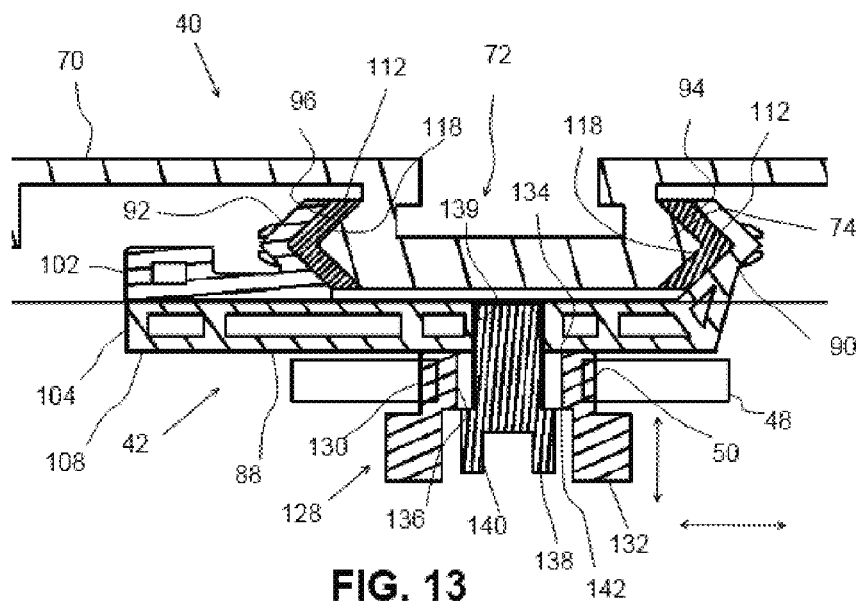
FIG. 13 is a partial view of the sliding table assembly of FIG. 12 showing the monorail and support member greater detail.

Referring to FIGS. 12 and 13, the movable bracket member 92 is configured to be pushed against the second lateral surface 96 of monorail 74 until the first lateral surface 94 of the monorail 74 is pressed against the first bracket member 90. Fastener structures 98, such as screws or bolts, are then tightened to secure the movable bracket member 92 in position on the main support member 88 with the monorail 74 squeezed tightly between the bracket members 90, 92. In the embodiment of FIGS. 6-13, the movable bracket member 92 is movably attached to the main support member 88 by a four fastening structures 98 (FIG. 11).

The movable bracket member 92 may be movably secured to the main support member 88 in any suitable manner. In one embodiment, the movable bracket member 92 includes an attachment portion 102 (FIGS. 12 and 13) that extends away from the monorail 74 and is slidably attached to a lateral section 104 of the main support member 88 by the fastener structures 98. The fastener structures 98 extend through slots (not visible) defined in the lateral section 104 of the main support member 88 and are attached, e.g., by threading, to the attachment portion 102 of the movable bracket member 92. In one embodiment, the bracket members 90, 92 and the support member 88 are formed as aluminum extrusions with machined slots and mounting features although in alternative embodiments any suitable type of material may be used and method of manufacture may be used.

As best seen in FIG. 11, the fastener structures 98 include head portions that are positioned against the bottom surface 108 of the main support member 88. When the fastener structures 98 are rotated in a first direction, the fastener structures 98 pull the movable bracket member 92 against the upper surface 110 of the main support member 88 until the movable support member 92 is clamped in position with respect to the main support member 88. The fastener structures 98 are rotated in the opposite direction to loosen the movable support member 92 to allow the movable bracket member 92 to be moved with respect to the main support member 88. By squeezing the monorail 74 between the bracket members 90, 92 and tightening the fastener structures 98, a zero clearance slide support can be provided for the sliding table member 40.

The zero clearance support of the sliding table member 40 provided by the bracket structure 78 of the support assembly 42 enables the total travel of the sliding table to exceed its depth, i.e., distance between the front edge portion and rear of the sliding table member 40. For example, as depicted in FIGS. 3 and 4, the zero clearance support configuration enables the sliding table member 40 to be supported with approximately 60-70% of the sliding table member overhanging the front edge portion or rear edge portion of the main table 14.

Figure 14:
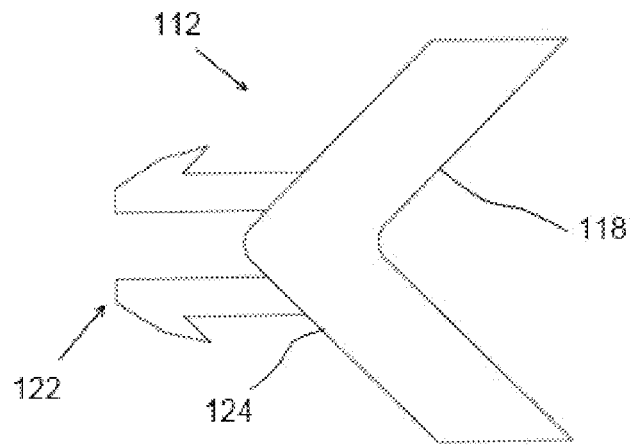
FIG. 14 is an end view of an embodiment of a glide insert for the bracket structure of the support assembly of FIG. 10 having an L-shaped sliding surface for clamping a monorail having a split diamond configuration as depicted in FIGS. 7 and 8.
Figure 15:
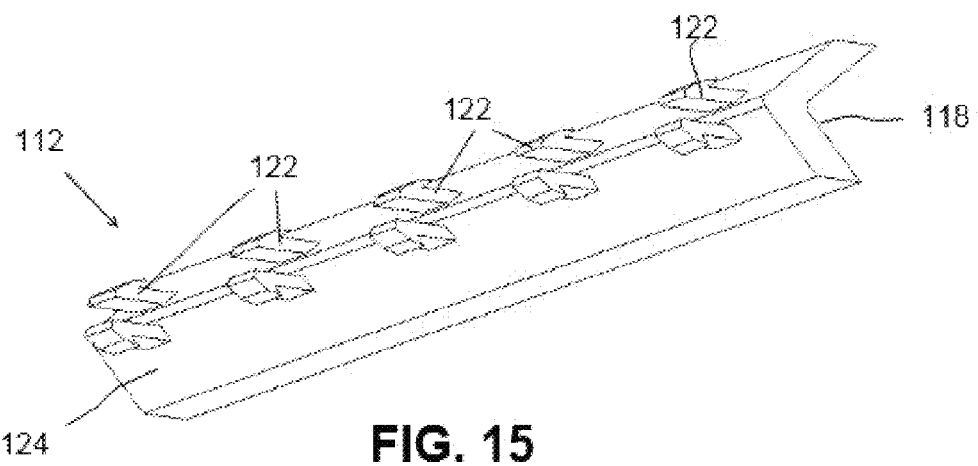
FIG. 15 is a perspective view of the embodiment of glide insert depicted in FIG. 14.
Figure 16:
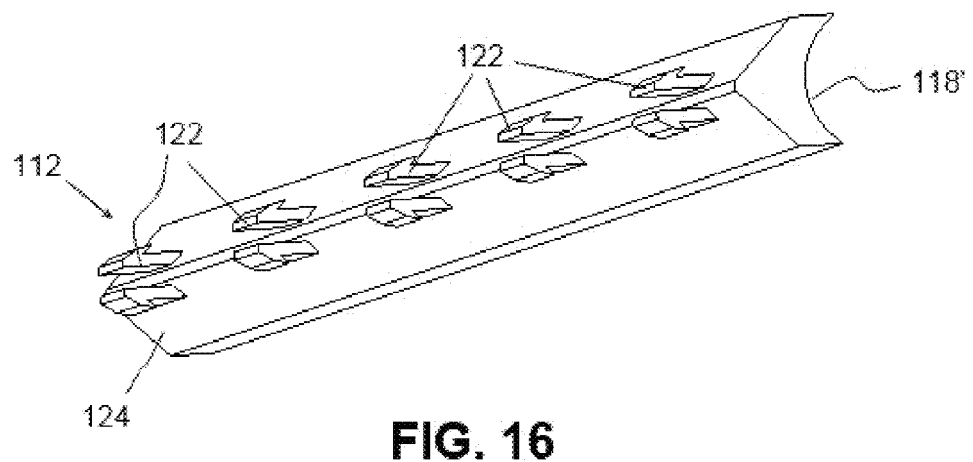
FIG. 16 is a perspective view of an embodiment of a glide insert for the bracket structure of the support assembly of FIG. 10 having a rounded sliding surface for clamping a monorail having a split cylinder configuration as depicted in FIG. 9.

To further enhance the zero clearance support and adjustment capability of the bracket structure 78, the bracket members 90, 92 may be equipped with glide inserts 112. The glide inserts 112 are formed of a plastic material and are attached to each of the inner facing surfaces of the bracket members 90, 92 to provide continuous uninterrupted sliding surfaces 118 that extend longitudinally along the length of the support assembly 42. The sliding surfaces 118 of the glide inserts 112 are shaped to conform to the lateral surfaces 94, 96 of the monorail 74 (FIG. 13). FIGS. 14 and 15 depict an embodiment of a glide insert 112 having a sliding surface 118 shaped to conform to a monorail 74 having a split diamond configuration such as depicted in FIGS. 7, 8, 12 and 13. FIG. 16 depicts an embodiment of a glide insert 112 having a sliding surface 118' shaped to conform to a monorail 74' having a split cylinder configuration such as depicted in FIG. 9.

Referring to FIGS. 12 and 13, the shaped sliding surfaces 118 eliminate play between the lateral surfaces 94, 96 of the monorail 74 and the bracket members 90, 92 to provide zero clearance support and adjustment capability. In one embodiment, the glide inserts 118 are configured for quick connection to the bracket members 90, 92 without requiring the use of separate fasteners or adhesive. As can be seen in FIGS. 14-16, the glide inserts 112 may include quick connect features, such as snap fit connectors 122, that project from the attachment side 124 of the glide inserts 118. The bracket members 90, 92 define slots 126 (FIG. 10) for receiving the snap fit connectors 122. The quick connect features 122 allow the glide inserts 118 to be easily removed and replaced if the inserts become worn or damaged.

Referring to FIGS. 12 and 13, the support assembly 42 includes adjustment mechanisms that enable adjustments of both the vertical position and the horizontal position of the sliding table member 40 relative to the main table 14. The vertical adjustment mechanism enables the upper surface 70 of the sliding table member 40 to be aligned in plane with the upper surface 20 of the main table 14. In the embodiment of FIGS. 6-13, the support assembly 42 includes adjustment nuts 128 that are configured to enable vertical position adjustments of the sliding table member 40.

As can be seen in FIG. 13, the adjustment nuts 128 include a threaded portion 130 and a knob portion 132. The threaded portion 130 is received in complementarily sized and threaded mounting holes 50 provided in the mounting structures 48 of the main table 14. The threaded portions 130 of the adjustment nuts 128 extend through mounting holes 50 of the mounting structures 48 from the bottom to position a support portion 134 of the adjustment nuts 128 in engagement with the bottom surface 108 of the main support member 88.

The knob portions 132 of the adjustment nuts 128 are accessed from below the mounting structures 48 and are used to turn the threaded portions 130 within the threaded mounting holes 50. Turning the knob 132 in a first direction results in the support portion 134 of the adjustment nut 128 protruding farther above the mounting structures 48 which causes the support assembly 42, and consequently the upper surface 70 of the sliding table member 40, to be moved upwardly in relation to the upper surface 20 of the main table 14. Turning the knob 132 in the opposite direction results in the support portion 134 of the adjustment nut 128 being retracted toward the mounting structure 48 which causes the support assembly 42 and upper surface 70 of the sliding table member 40 to be moved downwardly with respect to the upper surface 20 of the main table 14.

In the embodiment of FIGS. 6-13, two adjustment nuts 128 are utilized for vertical adjustments with one adjustment being located near each end portion of the support assembly 42. The two adjustment nuts 128 enable the vertical position of each end of the sliding table member 40 to be adjusted separately to facilitate alignment of the upper surface 70 of the sliding table member 40 with the upper surface 20 of the main table 14.

To enable horizontal adjustments, slots 136 are defined in the adjustment nuts 128 that extend through the threaded portions 130. A fastening structure 138, such as a screw or bolt, is extended through the slot 136 and threaded into a complementarily sized and threaded opening 139 provided in the main support member 88. The limits of lateral movement are defined by the interaction of the fastener structures 138 with the slots 136.

As can be seen in FIG. 13, the fastening structure 138 includes a head portion 140 that is positioned against an inner surface 142 of the adjustment nut 128. When the fastener structures 138 are rotated in a first direction, the fastener structures 138 pull the support member 88 against the support portion 134 of the adjustment nut 128 and/or the upper surface of the mounting structure 48 until the main support member 88 is clamped in position with respect to the mounting structure 48.

The fastener structures 138 are rotated in the opposite direction to loosen the fastening structures 138 and allow them be moved laterally with respect to the slots 136 in the adjustment nuts 128 so that the horizontal position of the sliding table member 40 can be adjusted. When a desire horizontal position has been attained, the fastening structures 138 can be rotated in the first direction to tighten the fastening structures 138 so as to secure the main support member 88 of the support assembly 42 in position on the mounting structures 48. In the embodiment of FIGS. 6-13, the horizontal position of each end of the sliding table member 40 can be adjusted individually to facilitate alignment of the miter slot 72 in parallel with the blade 18.

Figure 17:
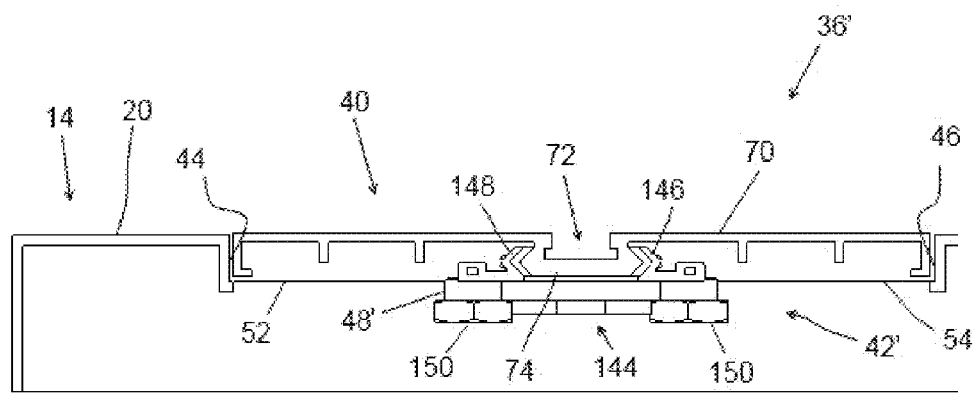
FIG. 17 is an end view of a sliding table assembly with an alternative embodiment of a support assembly.
Figure 18:
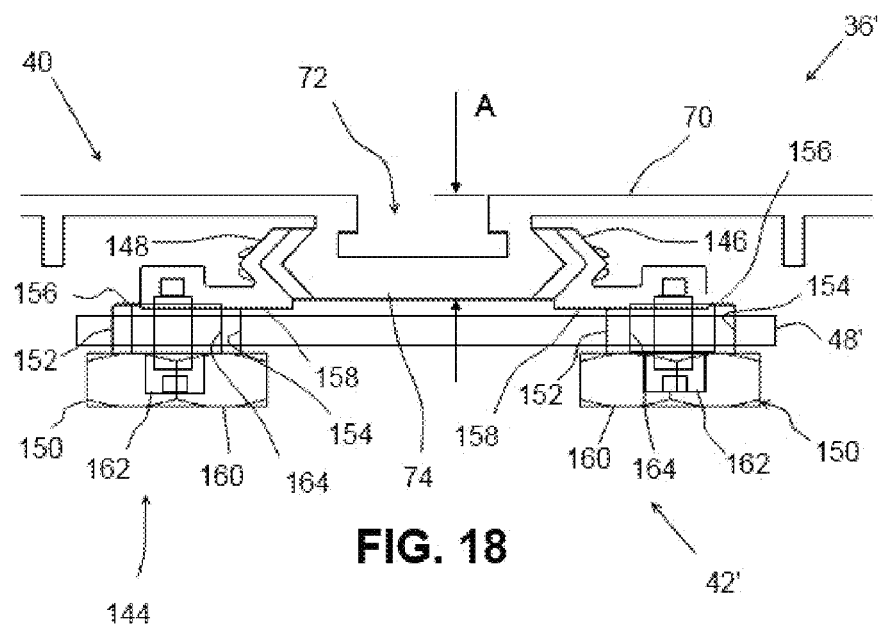
FIG. 18 is a partial end view of the sliding table assembly of FIG. 12 showing the monorail and support member greater detail.

An alternative embodiment of a support assembly 42' for a sliding table assembly 36' is depicted in FIGS. 17 and 18. In FIGS. 17 and 18, the support assembly 42' is integrated into the main table 14 so that assembly and adjustment of the sliding table assembly 36 is performed directly on the main table 14. As depicted, the support assembly 42' includes a bracket structure 144 having a first bracket member 146 and a second bracket member 148 that are each movably attached directly to mounting structures 48' incorporated into the main table 14. The mounting structures 48' are similar in configuration to the mounting structures 48 of FIG. 5.

Each of the bracket members 146, 148 has a configuration similar to the configuration of the movable bracket member 92 of the support assembly 42 of FIGS. 6-13. One difference between the embodiment of FIGS. 6-13 and the embodiment of FIGS. 17 and 18 is that each bracket member 144, 146 is supported by an adjustment nut 150. As can be seen in FIG. 18, the adjustment nuts 150 include threaded portions 152 that are received in complementarily sized and threaded mounting holes 154 provided in the mounting structures 48' of the main table 14. The threaded portions 152 of the adjustment nuts 150 extend through mounting holes 154 of the mounting structures 48' from the bottom to position a support portion 156 of the adjustment nuts 150 in engagement with the bottom surfaces 158 of the bracket members 146, 148.

The knob portions 160 of the adjustment nuts 150 are accessed from below the mounting structures 48' and are used to turn the threaded portions 152 within the threaded mounting holes 154 in order to raise or lower the bracket members 146, 148 in relation to the main table 14. An adjustment nut 150 is positioned near each end of both bracket members 146, 148 for a total of four adjustment nuts 150. The four adjustment nuts enable each corner of the sliding table member 40 to be adjusted vertically, which allows tilting of the sliding table member 40, to facilitate aligning of the upper surface 70 of the sliding table member 40 in plane with the upper surface 20 of the main table 14.

In the embodiment of FIGS. 17 and 18, horizontal adjustments are enabled by extending fastening structures 162 through the slots 164 defined in the adjustment nuts 150 and threading the fastening structures 162 into complementarily sized and threaded openings (not shown) provided in the movable bracket members 146, 148. When the fastener structures 162 are rotated in a first direction, the fastener structures 162 pull the bracket members 146, 148 against the support portion 156 of the adjustment nut 150 and/or the upper surface of the mounting structure 48' until the bracket members 146, 148 are clamped in position with respect to the mounting structures 48'.

The fastener structures 162 are rotated in the opposite direction to loosen the fastener structures 162 and allow the fastening structures 162 to move laterally with respect to the slots 164 in the adjustment nuts 150 so that the horizontal position of each bracket member 146, 148 can be adjusted. In this embodiment, the horizontal positions of the bracket members 146, 144 are adjusted in this manner to clamp the monorail 74 portion of the sliding table member 40 between the bracket members 144, 146 as well as to adjust the horizontal position of the sliding table member 40 with respect to the main table 14 in order to align the miter slot 72 in parallel with the blade 18.

While the embodiment of the support assembly 42' of FIGS. 17 and 18 requires that assembly and adjustments be performed directly on the main table 14, the support assembly 42' requires less vertical space than the support assembly 42 of FIGS. 6-13. For instance, in the embodiment of FIGS. 17 and 18, the bracket members 144, 146 are supported at each end by the mounting structures 48' and there is no need for a support member that extends across the main table 14 below the monorail as is the case in the embodiment of FIGS. 6-13. As a result, the vertical space occupied by the sliding table assembly below the main table 14 in the embodiment of FIGS. 17 and 18 is less than the vertical space occupied by the sliding table assembly of FIGS. 6-13.

As depicted in FIG. 18, the vertical space A that is occupied by the sliding table assembly below the main table corresponds to the thickness of the sliding table member 40 between the upper surface 70 and the bottom surface of the monorail 74 which, in one embodiment, is approximately 0.5 inches. As a result, the motor (not shown) for the table saw can be mounted closer to the upper surface of the main table 14 which allows the offset of drive system from the motor to be minimized.

Figure 19:
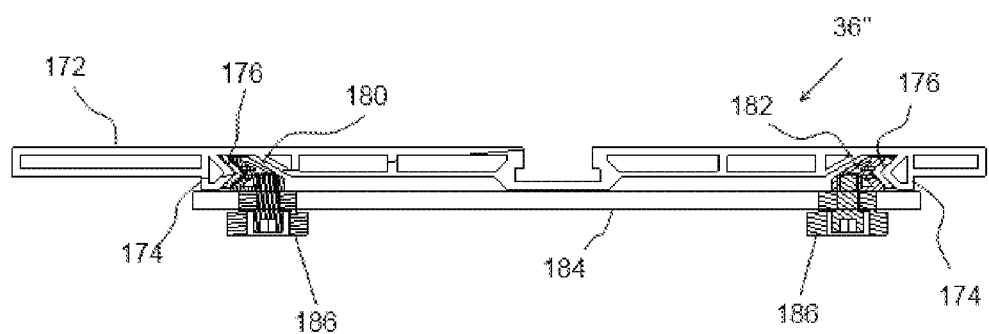
FIG. 19 depicts another alternative embodiment of a sliding table assembly for the table saw of FIG. 2.

FIG. 19 shows another alternative embodiment of a sliding table assembly 36" for the main table of the table saw. In the embodiment of FIG. 19, the sliding table member 172 includes a pair of rail structures 174 with inwardly facing support surfaces 176 rather than a single monorail having outwardly facing support surfaces as described above. The inwardly facing surfaces 176 have the same angled configuration as the lateral surfaces 94, 96 of the monorail 74 having the split diamond configuration (FIGS. 7 and 8) although in alternative embodiments the inwardly facing surfaces 176 may have rounded surfaces similar to the lateral surfaces of the monorail having the split cylinder configuration (FIG. 9) or other suitable shapes.

As can be seen in FIG. 19, the support assembly 178 includes a first bracket member 180 and a second bracket member 182 that are each movably supported on mounting structures 184 on the main table by adjustment nuts 186. In the embodiment of FIG. 19, the bracket members 180,182 face away from each other and are configured to be moved outwardly against the inwardly facing support surfaces 176 of the rail structures 174. The adjustment nuts 186 have substantially the same configuration as the adjustment nuts 128, 150 described above are configured to enable vertical adjustment of the bracket members 180, 182 with respect to the mounting structures 184.

Although not visible in FIG. 19, fastening structures (not shown) that are similar in configuration to the fastener structures 138, 162 are utilized to enable horizontal adjustments of the bracket members 180, 182. The fastener structures are extended through slots (not shown) in the adjustment nuts 186 and threaded into openings (not shown) provided in the bracket members 180, 182. The fastener structures are rotated in a first direction to tighten the fastener structures and clamp the bracket members 180, 182 to the mounting structures 184, and are rotated in the opposite direction to loosen the fastener structures to allow the bracket members to be moved laterally to press against the inwardly facing surfaces 176 of the rail structures 174 and to adjust the horizontal position of the sliding table member 172 with respect to the main table.

Figure 20:
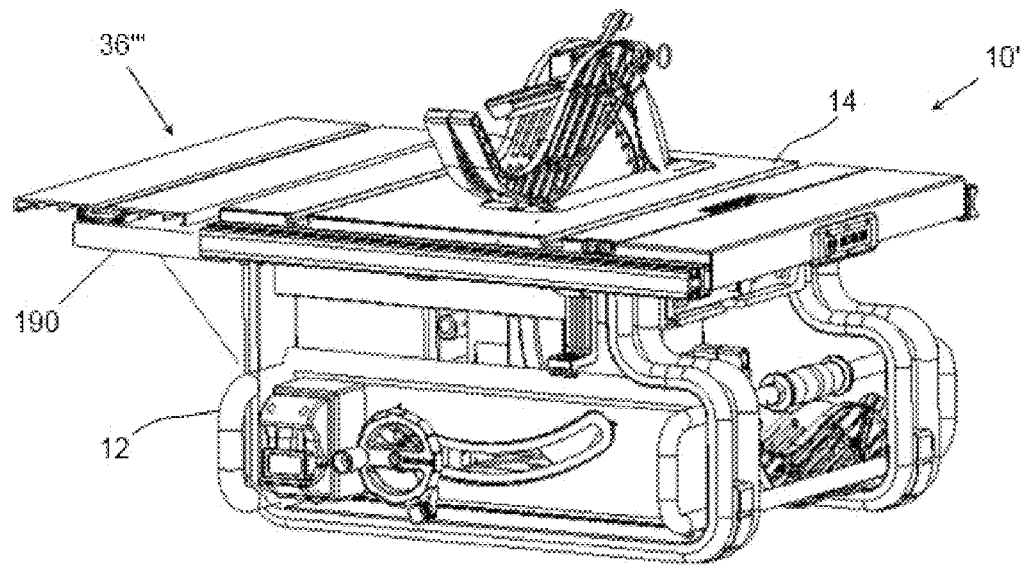
FIG. 20 depicts an alternative embodiment in which a sliding table assembly is mounted to an auxiliary support structure mounted to a side portion of a table saw.
Figure 21:
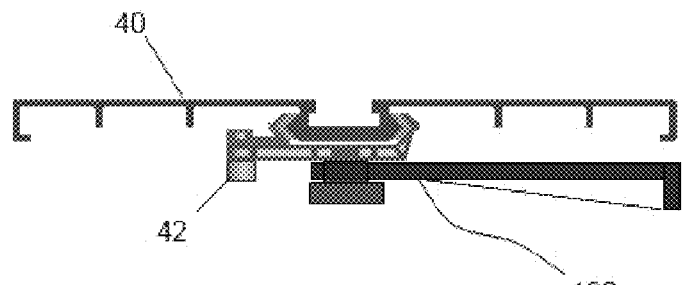
FIG. 21 depicts the auxiliary support structure of FIG. 20 supporting a sliding table assembly as depicted in FIGS. 6-13.
Figure 22:
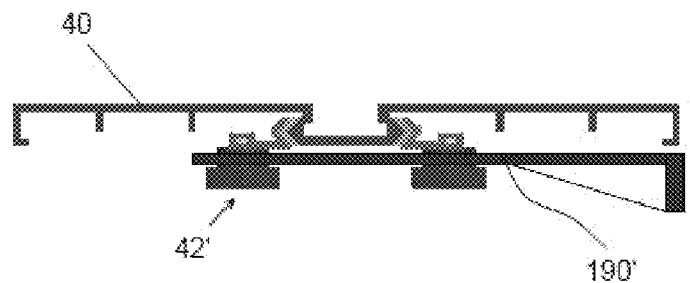
FIG. 22 depicts the auxiliary support structure of FIG. 20 supporting a sliding table assembly as depicted in FIGS. 17 and 18.

FIG. 20 depicts another alternative embodiment of a sliding table assembly 36''' for a table saw 10'. In FIG. 20, the sliding table assembly 36 is configured for attachment to a lateral edge portion 28, 30 of the main table 14. As depicted in FIG. 20, an auxiliary support structure 190 is attached, e.g., by bolting, to a lateral edge of the main table 14 and/or a side portion of the frame 12. The auxiliary support structure can be configured to support and retain any of the types of sliding table assemblies described above. For example, FIG. 21 depicts an embodiment of the auxiliary support structure 190 that is configured to support the sliding table member 40 and support assembly 42 of FIGS. 6-13. FIG. 22 depicts an embodiment of the auxiliary support structure 190' that is configured to support the sliding table member 40 and support assembly 42' of FIGS. 17 and 18.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A sliding table assembly for a main table of a table saw, the sliding table assembly comprising:

a sliding table member including a planar upper surface and a rail that protrudes from a bottom portion of the sliding table member and extends longitudinally between a front edge portion and a rear edge portion of the sliding table member, the rail having a first lateral surface arranged facing in a first lateral direction and a second lateral surface arranged on opposite side of the rail from the first lateral surface and facing in a second lateral direction that is opposite the first lateral direction;

a bracket structure including a main support and a first bracket member and a second bracket member extending upwardly from the main support, the first and the second bracket member being arranged facing each other and spaced apart from each other so as to define a space therebetween in which the rail of the sliding table member is received, the first bracket member being positioned in engagement with the first lateral surface and the second bracket member being positioned in engagement with the second lateral surface;

a vertical position adjustment mechanism configured to be attached to a mounting structure on the main table of the table saw and including a support portion that protrudes above the mounting structure, the vertical position adjustment mechanism being movable upwardly and downwardly with respect to the mounting structure to alter a height of the support portion with respect to the mounting structure; and a horizontal position adjustment mechanism retained by the vertical position adjustment mechanism and secured to the main support, the main support being held against the support portion of the vertical position adjustment mechanism by the horizontal position adjustment mechanism, the horizontal position adjustment mechanism being slidable laterally with respect to the vertical position adjustment mechanism to alter a horizontal position of the main support with respect to the mounting structure;

wherein the rail is slidable with respect to the first bracket member and the second bracket member when clamped between the first bracket member and the second bracket member, and wherein the first bracket member is slidable laterally with respect to the main support toward and away from the second bracket member to alter a distance between the first bracket member and the second bracket member, the first bracket member being releasably secured to the main support at a desired distance from the second bracket member.

2. The assembly of claim 1, wherein the second bracket member is slidable laterally with respect to the main support toward and away from the first bracket member and releasably secured to the main support at a desired position.

3. The assembly of claim 1, wherein the rail has a split diamond cross-sectional shape.

4. The assembly of claim 1, wherein the rail has a split cylinder cross-sectional shape.

5. The assembly of claim 1, wherein sliding table assembly includes a miter slot in the upper surface that extends longitudinally between the front edge portion and the rear edge portion of the sliding table member.

6. The assembly of claim 5, wherein the miter slot is defined at least partially within the rail.

7. The assembly of claim 6, wherein the sliding table member comprises an aluminum extrusion.

8. The assembly of claim 1, wherein the first and the second bracket members each include glide inserts that are removably attached to the first and second bracket members and positioned in contact with the first and the second lateral surfaces of the rail to facilitate sliding of the rail with respect to the first and the second bracket members.

9. The assembly of claim 8, wherein the glide inserts include quick connect structures that protrude from an attachment side of the glide inserts, and wherein the first and the second bracket members define slots configured to releasably retain the quick connect structures.

10. The assembly of claim 8, wherein each of the glide inserts includes a sliding surface that is positioned in engagement with one of the first and the second lateral surfaces of the rail.

11. The assembly of claim 10, wherein the sliding surface has a shape that matches the shape of the first and the second lateral surfaces of the rail.

12. The assembly of claim 11, wherein the first and second bracket members are formed of a metal material, and wherein the glide inserts are formed of plastic.

13. The assembly of claim 1, further comprising an auxiliary support structure that is configured for attachment to a table saw extending laterally from the main table, and wherein the auxiliary support member includes the mounting structure.

* * * * *